United States Patent
Delmerico et al.

(10) Patent No.: US 7,761,190 B2
(45) Date of Patent: Jul. 20, 2010

(54) SYSTEM AND METHOD FOR UTILITY AND WIND TURBINE CONTROL

(75) Inventors: Robert William Delmerico, Clifton Park, NY (US); Nicholas Wright Miller, Delmar, NY (US)

(73) Assignee: General Electric Company, Niskayuna, NY (US)

(*) Notice: Subject to any disclaimer, the term of this patent is extended or adjusted under 35 U.S.C. 154(b) by 186 days.

(21) Appl. No.: 12/014,372

(22) Filed: Jan. 15, 2008

(65) Prior Publication Data

US 2008/0111380 A1    May 15, 2008

Related U.S. Application Data

(62) Division of application No. 11/289,349, filed on Nov. 29, 2005, now Pat. No. 7,345,373.

(51) Int. Cl.
- *G05B 15/00* (2006.01)
- *G05D 3/12* (2006.01)
- *G05D 13/00* (2006.01)
- *A47C 7/74* (2006.01)
- *G01R 21/00* (2006.01)
- *G01R 31/36* (2006.01)
- *F03D 9/00* (2006.01)

(52) U.S. Cl. .............. 700/297; 290/44; 290/55; 415/905; 416/170 R; 702/60; 702/61; 702/62; 700/75; 700/286; 700/287; 700/304

(58) Field of Classification Search .............. 290/44, 290/55, 1, 43; 700/75, 286, 287, 304, 297; 415/905; 416/170 R; 702/60–63

See application file for complete search history.

(56) References Cited

U.S. PATENT DOCUMENTS

| 4,400,795 A | 8/1983 | Irie et al. |
| 4,695,736 A | 9/1987 | Doman et al. |

(Continued)

FOREIGN PATENT DOCUMENTS

DE    19827261    3/2003

(Continued)

OTHER PUBLICATIONS

Miller et al., "Dynamic Modeling of GE. 1.5 and 3.6 and MW Wind Turbine Generators for Stability Simulations", IEEE 2003, p. 1977-1983.*

(Continued)

*Primary Examiner*—Albert DeCady
*Assistant Examiner*—Thomas H Stevens
(74) *Attorney, Agent, or Firm*—Ann M. Agosti

(57) ABSTRACT

An exemplary embodiment includes a wind turbine system. The wind turbine system includes a wind turbine generator operable to supply wind turbine power to a utility system. A converter is coupled to the wind turbine generator and the utility system. The wind turbine system also includes a controller comprising an internal reference frame of the wind turbine generator, coupled to the converter, and configured for modulating flow of power through the converter in response to frequency disturbances or power swings of the utility system relative to the internal reference frame.

12 Claims, 8 Drawing Sheets

U.S. PATENT DOCUMENTS

| | | | |
|---|---|---|---|
| 4,700,081 A | 10/1987 | Kos et al. | |
| 4,812,730 A | 3/1989 | Nakagawa et al. | |
| 4,903,184 A | 2/1990 | Hirose | |
| 5,225,712 A | 7/1993 | Erdman | |
| 5,729,118 A | 3/1998 | Yanagisawa et al. | |
| 6,094,602 A * | 7/2000 | Schade, III | 700/45 |
| 6,420,795 B1 | 7/2002 | Mikhail et al. | |
| 6,670,721 B2 * | 12/2003 | Lof et al. | 290/44 |
| 6,853,094 B2 | 2/2005 | Feddersen et al. | |
| 6,858,953 B2 * | 2/2005 | Stahlkopf | 290/44 |
| 6,924,565 B2 | 8/2005 | Wilkins et al. | |
| 7,180,202 B2 | 2/2007 | Wobben | |
| 7,432,686 B2 * | 10/2008 | Erdman et al. | 322/44 |
| 2005/0122083 A1 | 6/2005 | Erdman et al. | |
| 2006/0119105 A1 | 6/2006 | Kang et al. | |
| 2006/0273595 A1 * | 12/2006 | Avagliano et al. | 290/44 |
| 2008/0007121 A1 * | 1/2008 | Erdman et al. | 307/47 |

FOREIGN PATENT DOCUMENTS

| | | |
|---|---|---|
| EP | 0864748 | 9/1998 |
| GB | 2411252 | 8/2005 |
| GB | 2420456 | 5/2006 |
| WO | 03023224 | 3/2003 |
| WO | 03065559 | 8/2003 |
| WO | 2005/025026 | 3/2005 |

OTHER PUBLICATIONS

Excitation System Protective Limiters and Their Effect on Volf/Var Control—Design, Computer Modeling, and Field Testing IEEE 2000, p. 440-450.*

J. Mooney et al., "Application Guidelines for Power Swing Detection on Transmission Systems," IEEE, 59th Annual Conference for Protective Relay Engineers, 2006, pp. 289-298.

L. Holdsworth et al., Power System Frequency Response from Fixed Speed and Doubly Fed Induction Generator based Wind Turbines, Wind Energy 2004, vol. 7, pp. 21-35, (DOI:10.1002/we.105).

* cited by examiner

SYSTEM AND METHOD FOR UTILITY AND WIND TURBINE CONTROL

BACKGROUND

The invention relates generally to the field of wind turbine generators used for power generation for utilities, and more particularly to techniques for stabilizing power during transient conditions.

Wind turbine generators are regarded as environmentally friendly and relatively inexpensive alternative sources of energy that utilize wind energy to produce electrical power. A wind turbine generator generally includes a wind rotor having turbine blades that transform wind energy into rotational motion of a drive shaft, which in turn is utilized to drive a rotor of an electrical generator to produce electrical power. Modern wind power generation systems typically take the form of a wind-farm having multiple such wind turbine generators that are operable to supply power to a transmission system providing power to a utility system.

These wind turbine generators and wind-farms are typically designed to deliver power to the utility system with the power being independent of system frequency. Some wind turbine generators have a variable frequency operation and require a variable frequency power electronic inverter to interface the wind turbine generator output with the utility grid. In one common approach the wind turbine generator output is directly fed to a power electronic converter, where the turbine frequency is rectified and inverted into a fixed frequency as needed by the utility system. An alternative approach uses a doubly fed asynchronous generator (DFAG) with a variable frequency power electronic inverter exciting the DFAG rotor and stator windings being coupled directly to the utility system.

In traditional power systems, the frequency of the synchronous generators of the power system match the utility system, and the dynamic response of the frequency of the utility system is dependent upon the inertia of the synchronous generators and loads. Synchronous generators used in a traditional power system are able to contribute in frequency and voltage control of the power system during transient conditions, that is, sudden failure of generation, line fault or connection of a large load. During of transient conditions, the system frequency starts to change at a rate mainly determined by the total angular momentum of the system. The total angular momentum is a sum of the angular moment of all the generators and rotating loads connected to the power system. In such transient conditions, the synchronous generators may also provide additional control services that modulate active power to stabilize the power system and restore frequency to its nominal value.

Wind turbines, when used for generating power in a power system, however, do not contribute to the frequency stabilization of the utility system. As more power generated by wind turbines is interfaced through the utility system, it would be desirable for wind turbines to also contribute to the voltage and frequency control of the power system in transient conditions in order to stabilize the power system.

Gonzalo Costales Ortiz et al., WIPO Application No 03023224, describes a system for using turbine mechanical inertia for dynamic stability and frequency control. The system uses a fixed frequency reference and the derivative of frequency to calculate the supplemental torque and power output to the system. Derivative terms in control systems are subject to noise that may affect performance. A fixed reference is a difficulty in embodiments wherein the turbine control is desired to track the normal fluctuations in utility frequency without undue supplemental torque or power interactions.

Therefore there is a growing need to overcome the above mentioned limitations for wind turbine systems and to provide control techniques so that the wind turbines can participate in frequency regulation and power-swing stabilization for the utility system.

BRIEF DESCRIPTION

An exemplary embodiment includes a wind turbine system. The wind turbine system includes a wind turbine generator operable to supply wind turbine power to a utility system. A converter is coupled to the wind turbine generator and the utility system. The wind turbine system also includes a controller comprising an internal reference frame of the wind turbine generator, coupled to the converter, and configured for modulating flow of power through the converter in response to frequency disturbances or power swings of the utility system relative to the internal reference frame.

Another aspect of the invention includes a method for stabilizing frequency and power swings of a utility system. The method includes supplying power from a wind turbine generator to the utility system, and using an internal reference frame of the wind turbine generator for modulating flow of power from the wind turbine generator in response to frequency disturbances or power swings of the utility system relative to the internal reference frame.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
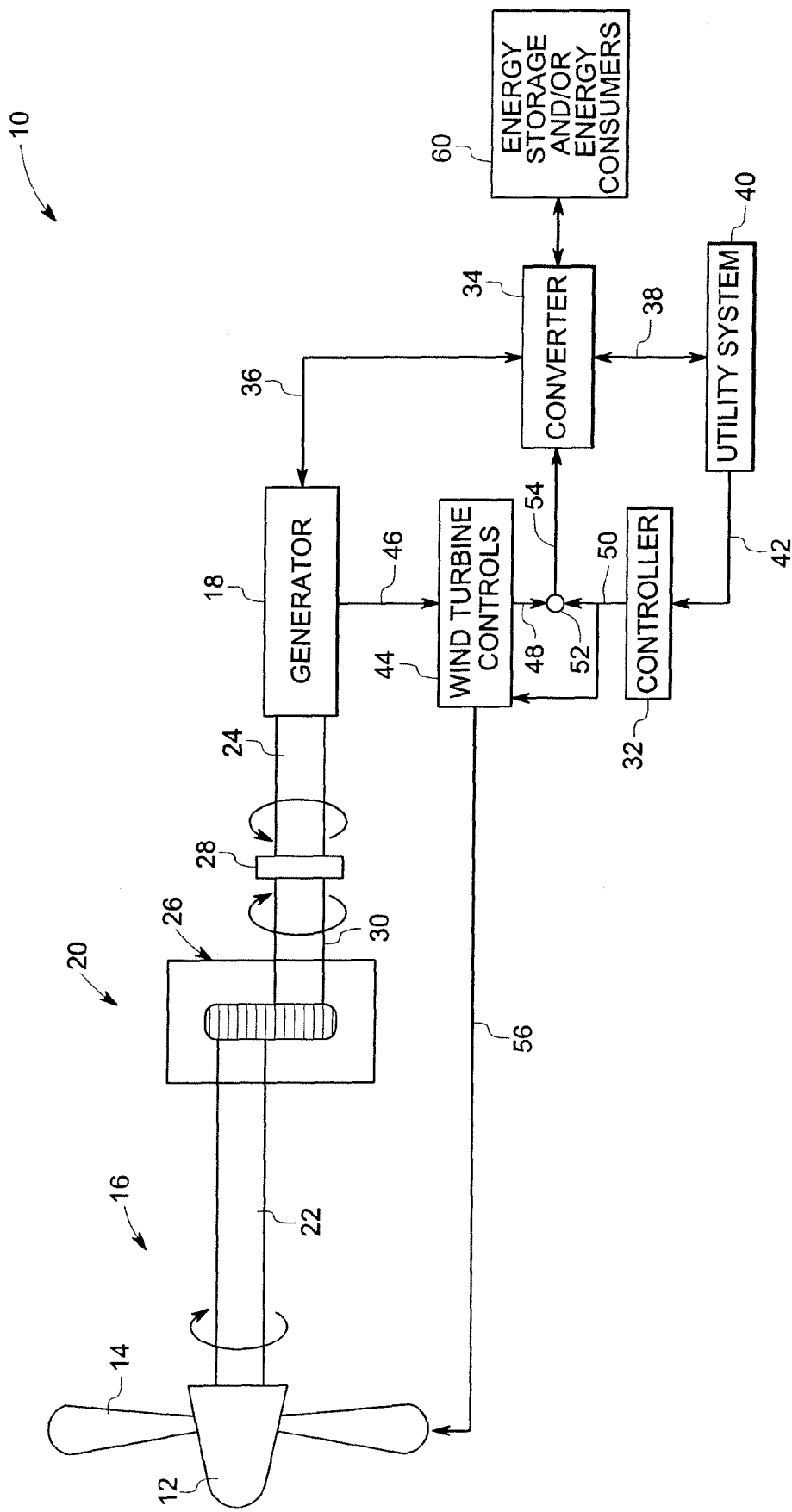
FIG. 1 is a diagrammatical representation of a wind turbine system for stabilizing power and frequency during transient conditions for a utility system in accordance with one embodiment.

Referring generally to FIG. 1, a wind turbine system 10 operable to generate electric power is provided. The wind turbine system 10 comprises a hub 12 having multiple blades 14. The blades 14 convert the mechanical energy of the wind into a rotational torque, which is further converted into electrical energy by the wind turbine system 10. The wind turbine system 10 further includes a turbine portion 16 that is operable to convert the mechanical energy of the wind into a rotational torque and a generator 18 that is operable to convert the rotational torque produced by the turbine portion 16 into electrical power. A drive train 20 is provided to couple the turbine portion 16 to the generator 18. The wind turbine generator 18 typically comprises a doubly fed asynchronous generator or a full conversion synchronous generator or a generator for use with a full converter. In a full conversion embodiment, the wind turbine generator stator windings (not shown) are directly fed to the converter. In a doubly fed embodiment, the generator rotor windings (not shown) are coupled to the converter and the generator stator windings (not shown) are coupled directly to the utility system.

The turbine portion 16 includes a turbine rotor low-speed shaft 22 that is coupled to the hub 12. Rotational torque is transmitted from the rotor low-speed shaft 22 to a generator shaft 24 via the drive train 20. In certain embodiments, such as the embodiment illustrated in FIG. 1, the drive train 20 includes a gear box 26 transmitting torque from a low-speed shaft 22 to a high speed shaft 30. The high speed shaft 30 is coupled to the generator shaft 24 with a coupling element 28. As the speed of the turbine rotor low-speed shaft 22 fluctuates, the frequency of the output of the generator 18 also varies. In one implementation of the above embodiment, the transient overload capability of the wind turbine electrical and mechanical systems at full load is utilized by decreasing blade pitch and/or turbine speed to transiently increase power. The degree and duration of this overload are managed such that undue stress on the mechanical and electrical system components is avoided.

In one exemplary embodiment, the generator 18 is coupled to wind turbine controls 44. The wind turbine controls 44 receive signals 46 from the generator that are representative of the operating parameters of the generator. The wind turbine controls 44 in response may generate control signals, for example a pitch signal 56 to change the pitch of the blades 14. The wind turbine controls 44 are also coupled to a controller 32 having an internal reference frame, described in more detail in reference to FIG. 2. The controller 32 is coupled to a converter 34. The input 48 from the wind turbine controls 44 and the input 50 from the controller 32 are summed in a summation element 52 and is supplied as input 54 to the converter 34. The converter 34 typically includes power electronics components to convert the variable frequency output 36 of the generator 18 into a fixed frequency output 38 for supply to a utility system or a power grid 40. The wind turbine controls 44, controller 32 and converter 34 are described in more detail with reference to FIG. 2.

The controller 32 is configured for modulating flow of power through the converter 34 in response to utility system frequency disturbances or power swings relative to the internal reference frame. The controller 32 is also coupled to the utility system 40 and receives input signals 42 from the utility system 40. The signals 42 may be representative of the utility system parameters, for example frequency or power.

Figure 2:
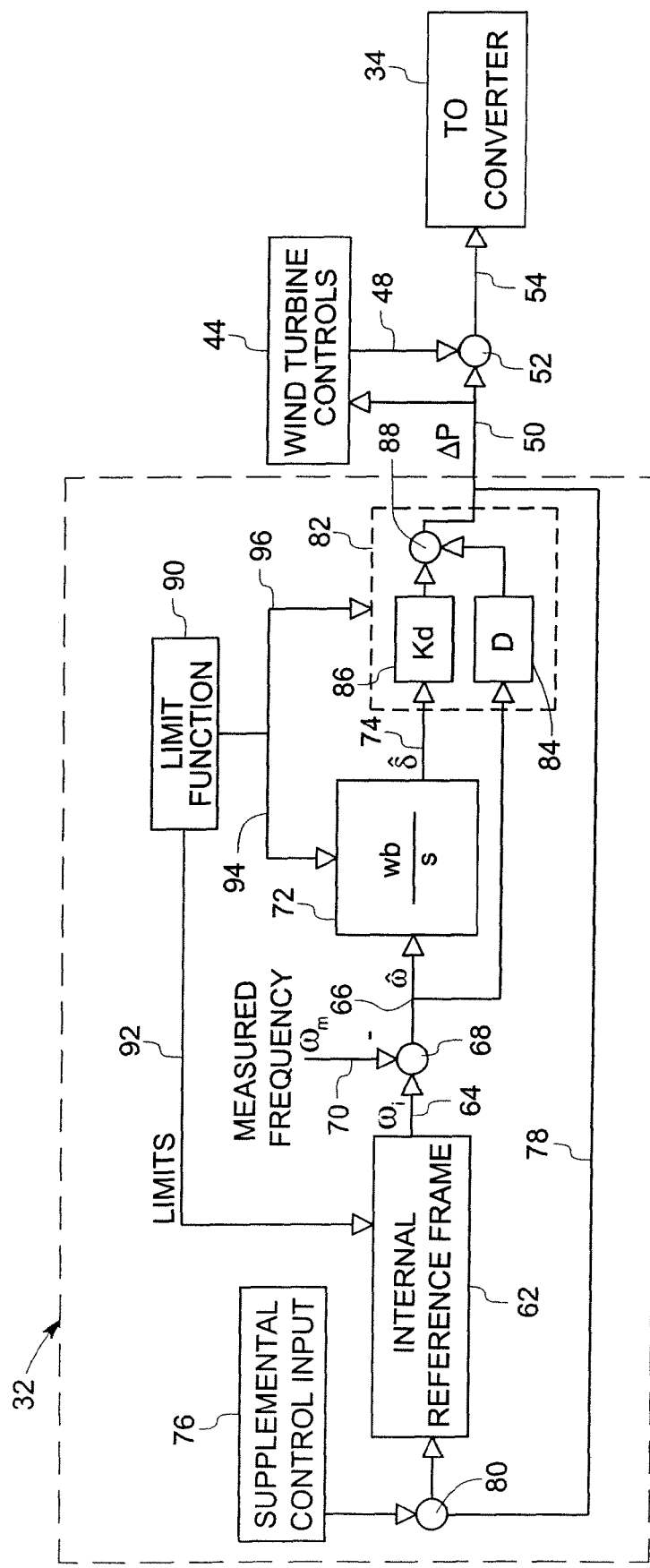
FIG. 2 is a diagrammatical representation of a control loop used by the controller of FIG. 1 to provide a supplemental input signal in order to stabilize power and frequency during transient conditions in accordance with one embodiment.

Also shown in FIG. 1 is block 60 representative of optional energy storage elements, optional energy consumer elements or combinations thereof. Energy storage elements may comprise elements such as batteries, capacitors, and flywheels, for example. Energy consumer elements may comprise loads or dissipative resistors, for example. Such elements may optionally be controlled by a local converter controller (within converter 34) or by another controller if desired. For example the flow of power in at least one energy storage element or an energy consumer element may be modulated in response to frequency disturbances or power swings of the utility system relative to the internal reference frame FIG. 2 is a diagrammatic illustration of an exemplary control loop employed in the controller 32. The controller 32 provides a supplemental input signal to the converter 34, which may comprise a power or torque signal and is denoted generally by reference numeral 50 and symbol $\Delta P$. It may be noted that power and torque are used interchangeably in the description herein. As discussed in more detail below, the supplemental input signal $\Delta P$ is typically a function of at least one of relative angle, relative frequency, or time with respect to the utility system and the internal reference frame. The supplemental input signal $\Delta P$ is expected to lead to an increase or decrease in power output of the wind turbine system to stabilize the overall utility system. $\Delta P$ is zero when the internal reference frame matches the utility system frequency and angle during steady-state conditions. Under transient conditions, if the system frequency or angle relative to the internal reference frame is decreasing then $\Delta P$ needs to be increased to enhance stable operation. Similarly, if the system frequency or angle relative to the internal reference frame is increasing then $\Delta P$ is decreased to enhance stable operation of the utility system. Further, the supplemental input signal $\Delta P$ may be continuous or discrete and may be implemented as a closed or open loop function, subject to certain system limits as discussed below.

Referring back to FIG. 2, a torque or power command signal 48 from wind turbine controls 44 may also be provided as an input to the converter 34. The supplemental input signal $\Delta P$ and the command signal 48 may be summed in the summation element 52. Converter 34 typically includes a local converter controller (not shown) for converting the inputs into converter switching signal commands. In another embodiment, the supplemental input signal 50 is fed into wind turbine controls 44, and summation element 52 is included within wind turbine controls 44. Such embodiments provide additional flexibility. For example, additional limit functions may be inserted between summation element 52 and converter 34. In still another embodiment, summation element 52 is outside of wind turbine controls 44, and the supplemental input signal 50 is fed into the wind turbine controls 44 in addition to being fed to the summation element 52. When the supplemental input signal 50 is provided to wind turbine controls 44, there is an option to use the supplemental input signal 50 for feed forward control of features such as blade pitch or turbine speed control, for example. It may be noted, that the wind blade pitch control signal or the turbine speed control signal may be provided in response to the frequency disturbances or the power swings of the utility system relative to the internal reference frame. In still another embodiment, the supplemental input signal 50 can be used to modulate optional energy storage elements, optional energy consumer elements or combinations thereof (shown as element 60 in FIG. 1).

The controller 32, as described above, uses a control technique that transiently increases power output as a function of relative angle, or relative frequency between the utility system 40 (shown in FIG. 1) and the internal reference frame 62 of the wind turbine generator. The controller 32 is thus configured for modulating flow of power through the converter 34 in response to frequency disturbances or power swings of the utility system relative to the internal reference frame 62. The internal reference frame 62 is implemented as an integrator in an exemplary embodiment that emulates a "virtual inertia" with a magnitude defined by the constant "M". The internal reference frame 62 has an output 64 that is variable and is the frequency of the internal reference frame $\omega_i$. During steady-state conditions the frequency output 64 of the internal reference frame 62 will equal the frequency of the utility system. The frequency output 64 may differ from the utility system during frequency disturbances.

The relative frequency $\hat{\omega}$, donated by reference numeral 66 is obtained from difference element 68 as a difference of measured frequency $\omega_m$ (measured utility system frequency) depicted generally by reference numeral 70 and the frequency of rotation of the internal reference frame $\omega_i$. The relative frequency $\hat{\omega}$ is delivered to block 72, where it is adjusted by the base frequency $\omega_b$, and integrated to generate an angle $\hat{\delta}$, depicted generally by reference numeral 74 that is a relative angle with respect to the internal reference frame 62. The relative angle $\hat{\delta}$ is thus calculated from the integral of the relative frequency $\hat{\omega}$ multiplied by a constant base frequency $\omega_b$ to convert per unit frequency to radians.

A supplemental control input 76 may be used as an optional input to the internal reference frame 62 in one example to add the control features of power droop with frequency. Feedback loop 78 is provided to adjust the internal reference frame output as a function of the change in turbine power or torque, which may be combined at summation element 80 with supplemental control input 76. For the exemplary embodiment, this feedback loop will emulate the inertial effect on internal reference frame frequency due to changes in power output. In an optional closed loop embodiment, the feedback loop 78 may be derived from the difference between turbine control torque or power command 48 and measured turbine power, which may further optionally be combined at summation element 80 with supplemental control input 76.

The controller 32 is further configured to employ a torque or power transfer function 82, in one example to generate the supplemental input signal ΔP. In a more specific embodiment, wherein transfer function 82 is a function of both relative angle and relative frequency, the relative frequency is modified by damping element D, shown generally by reference numeral 84, the relative angle is modified by a torque or power constant, the Kd element, shown generally by reference numeral 86, and the sum is provided at summation element 88 to obtain supplemental input signal ΔP. As discussed above, an exemplary implementation also accommodates additional energy storage and energy dissipative elements.

A limit function 90 is additionally employed in an exemplary embodiment for limiting the relative angle 74, an internal reference frame frequency 64, a power or torque signal 50, or any combinations thereof. Although a single block 90 is illustrated for purposes of example, one or more functions or controllers may be used to implement limit function 90 if desired. Limits are useful because, when the wind turbine generator is operating at or near rated power output, then an increase in power will tend to overload the generator and converter. The limits 92, 94 or 96, used by the limit function 90 may be absolute limits, time-dependent limits, or combinations thereof. Some non-limiting examples of the limits used by the limit function 90 include physical limitations on the wind turbine system, power limits, torque limits, ramp rate limits, energy limits, and rotor speed limits of the wind turbine generator. Examples of physical limits include thermal capability of the power conversion equipment, converter current limits and drive shaft mechanical stress. Examples of energy limits include energy storage and dissipative energy limits.

Further there may be specific upper limits and lower limits for system stability. An upper limit used by the limit function 90 is typically a function of one or more of the following: converter thermal conditions, loading history, time and even ambient temperature. The lower limit will tend to be symmetric compared to the upper limit, although it is not required to be so. Further the limit function can be a limit on the output of a control block, or a limit or deadband on the input to a control block. The deadband limit is type of limit where over some band around zero there is no action and beyond a threshold an action is required to accommodate the limit. Some exemplary limits employed by the controller 32 are described in more detail below and with reference to FIG. 3.

As a specific example, since the total energy balance on the wind turbine dictates the drive-train speed, the energy balance may be used to determine the limits as discussed herein. Power extracted from the turbine, beyond that supplied by wind induced torque, will slow the machine down. The total energy extracted is the integral of this power difference. Also, the turbine has a lower limit on speed, below which stall occurs. Thus, the total energy extracted must also be limited, so that a minimum speed is maintained, with some margin. In one example, a dynamic limit that is a function of the energy extracted may be used to address this aspect.

Figure 3:
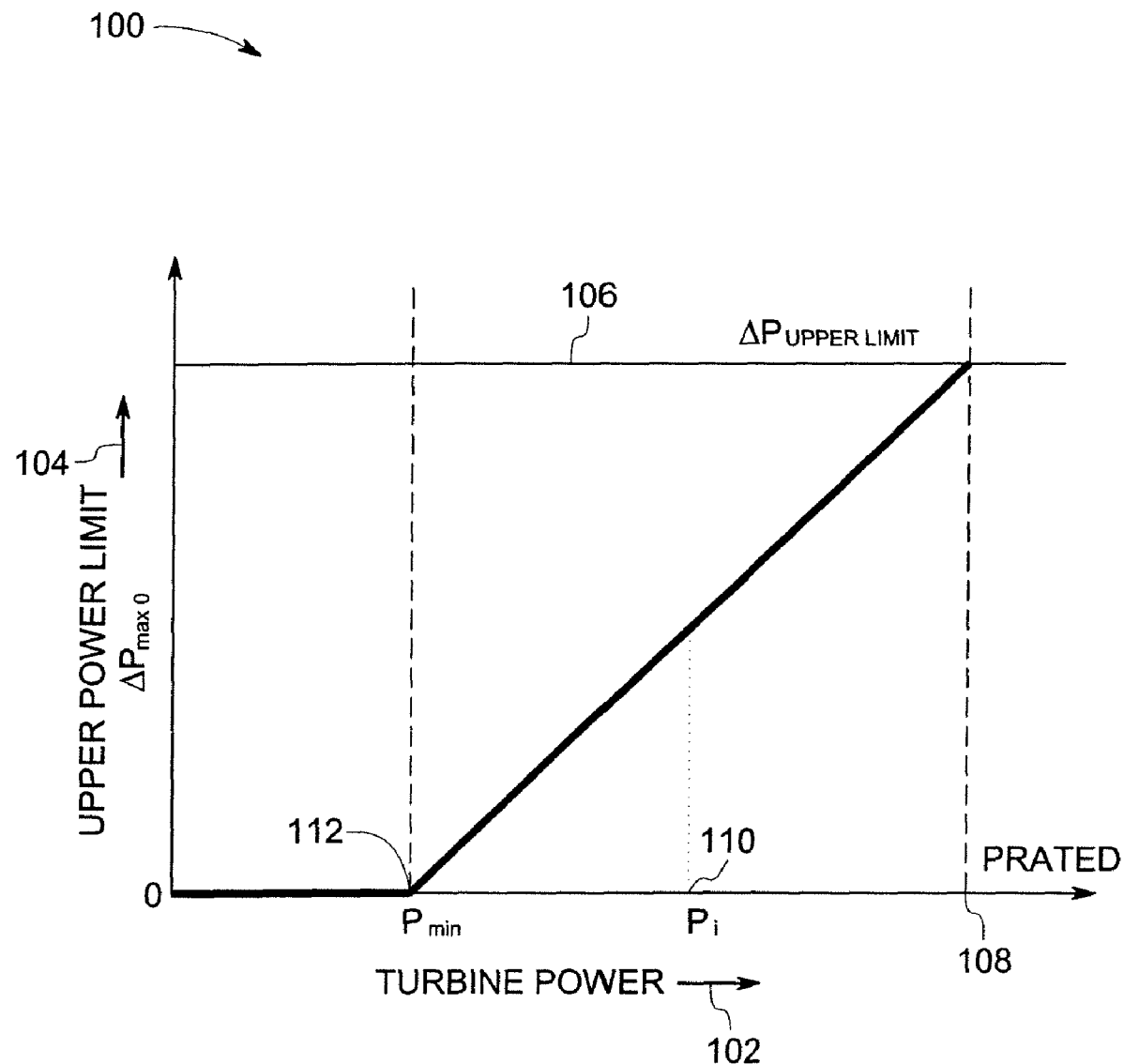
FIG. 3 is a graphical representation of exemplary power limits enforced while generating the supplemental input signal in the control loop of FIG. 2.

FIG. 3 is a graphical representation of an upper power limit in the control technique of FIG. 2. The graph 100, shows X-axis as turbine power (Pi), denoted generally by reference numeral 102, and Y-axis as upper limit $\Delta P\max_0$, shown generally by reference numeral 104. A maximum upper limit, $\Delta P_{upper\ limit}$ is assigned in one exemplary embodiment, as shown by reference numeral 106. Thus, at any instant of time, the upper limit, $\Delta P\max_0$ may be calculated as follows:

$$\Delta P\max_0 = \Delta P_{upper\ limit}\{(Pi-P_{min})/(P_{rated}-P_{min})\} \quad (1),$$

wherein $\Delta P_{upper\ limit}$ is a hard upper limit, such as 10% of the rated power for example; $P_{rated}$ is the rated power of the wind turbine generator, such as 1500 KW (Kilo Watts) for example, shown by reference numeral 108; Pi is the turbine power reading at the time of transient condition, shown generally by reference numeral 110; and $P_{min}$ 112 is the lowest turbine power below which the controller function is disabled for any upward regulation.

A higher order limitation (i.e. not linear) is expected to optimize performance. In this example, the limit is further constrained as a function of energy, as shown below in equation 2:

$$\Delta P\max(t) = \Delta P\max_0 - k\int \Delta P dt. \quad (2)$$

Equation 2 illustrates a time dependent limitation of an upper power limit $\Delta P\max(t)$ based on power history ($k\int \Delta P$ dt) with k being a constant and t being time.

In another embodiment, the limit is a function of rotor speed. The following equation uses a linear function for purposes of example; more complex functions of turbine speed may be applied if desired.

$$\Delta P\max(t) = \Delta P\max_0\{(\upsilon(t)-\upsilon_{min})/(\upsilon_{rated}-\upsilon_{min})\} \quad (3),$$

wherein $\upsilon_{min}$ is greater than turbine minimum speed to provide margin, $\upsilon_{rated}$ is turbine speed at rated power and $\upsilon(t)$ is the instantaneous speed of the wind turbine generator. It would be well appreciated by those skilled in the art, that similar equations would apply to minimum ΔP limits, but with appropriately adjusted signs and limits.

The system dynamics around an equilibrium point for a collection of generators connected to a utility network are summarized below in equation (4), where ω and δ are vectors of electrical frequency and angle of the generators, relative to a common reference frame respectively; and M, D, K and C are the equivalent matrices of system inertia, damping coefficients, torque constants and coupling coefficients, respectively. The term $\Delta P(t, \hat{\delta}, \hat{\omega})$ is the supplemental power contribution from the wind turbine generator relative to the internal variables $\hat{\omega}$ and $\hat{\delta}$.

$$\begin{bmatrix} \dot{\delta} \\ \dot{\omega} \end{bmatrix} = \begin{bmatrix} 0 & C \\ M^{-1}K & M^{-1}D \end{bmatrix} \begin{bmatrix} \delta \\ \omega \end{bmatrix} + \begin{bmatrix} 0 \\ \Delta P(t, \hat{\delta}, \hat{\omega}) \end{bmatrix} \quad (4)$$

The response of a simple lumped inertia utility system 40 subject to a disturbance $\Delta P_d$ is given below in equation (5):

$$M\dot{\omega} + D\omega + K\delta = \Delta P(t, \hat{\delta}, \hat{\omega}) + \Delta P_d$$

$$\dot{\delta} = \omega \cdot \omega_b \quad (5)$$

where $\omega_b$ is the base frequency of the system.

One control strategy for generating the supplemental power input signal ΔP is to add synchronizing and damping terms in phase with elements of $\hat{\delta}$ and $\hat{\omega}$, respectively. These terms are used to help shape the system disturbance response to reduce the slope and magnitude of angular swings, and improve damping as will be described in reference with FIG. 4-7. The control loop as shown in FIG. 2 takes advantage of the inherent overload capability of the wind turbine electrical and mechanical system subject to limits on maximum torque, power, ramp rates, and generator speed. Using dissipative resistors and supplemental energy storage with closed-loop damping controls minimizes interaction with turbine mechanical resonances.

Figure 4:
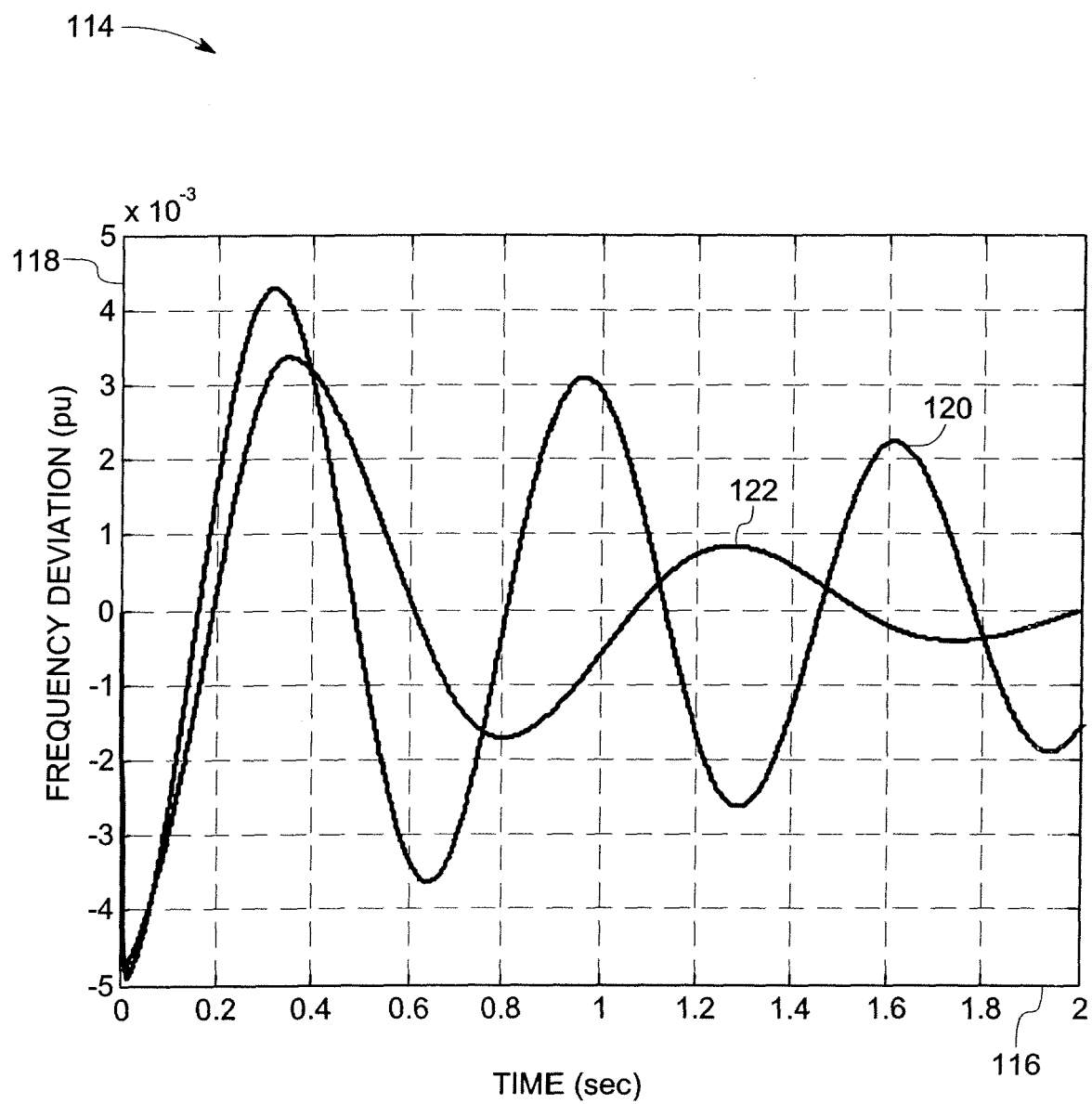
FIG. 4 is a simulated graphical representation of frequency deviation or disturbance response for an oscillatory system disturbance with and without the control loop as shown in FIG. 2.
Figure 5:
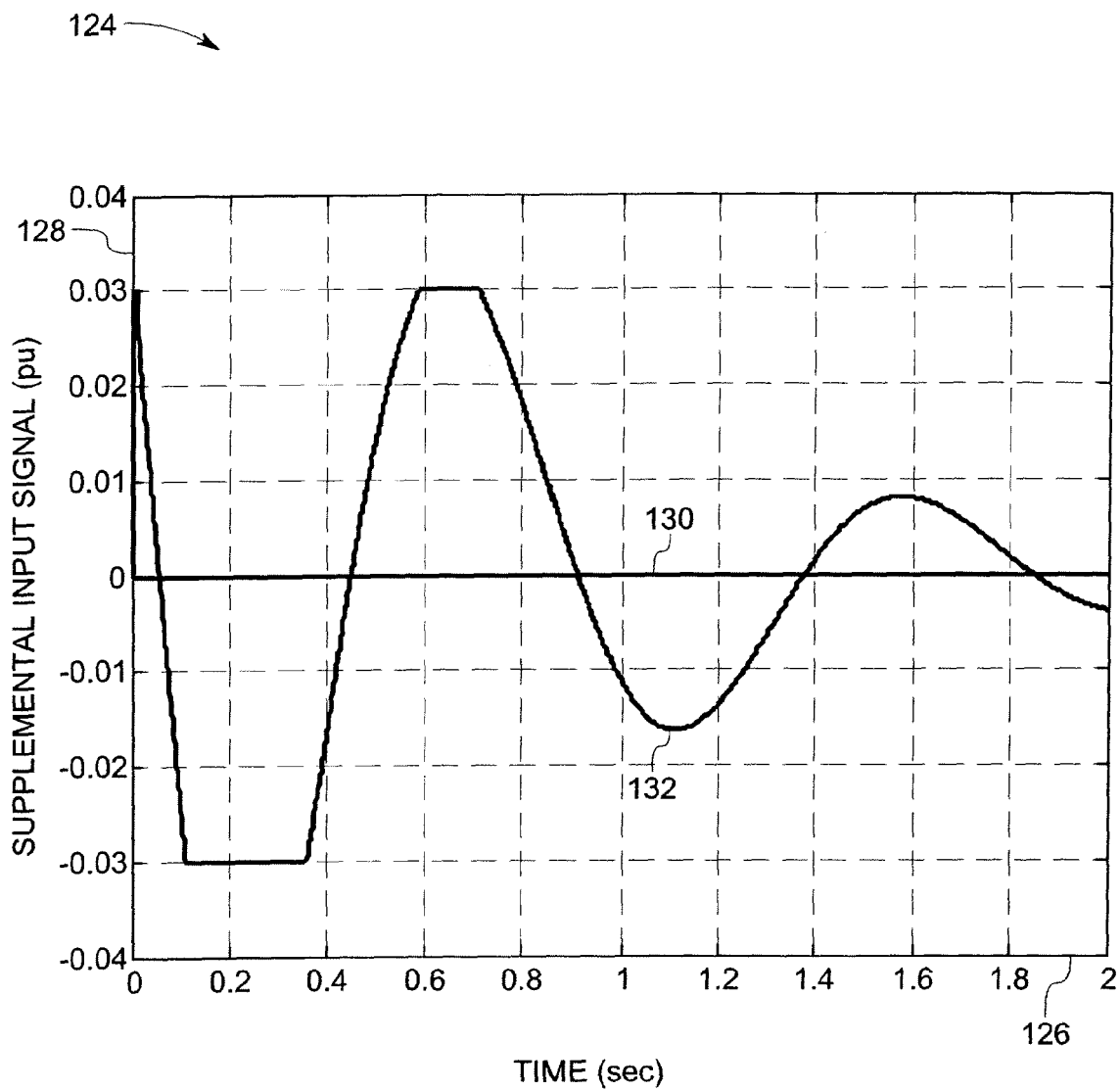
FIG. 5 is a simulated graphical representation of the supplemental power disturbance response for an oscillatory system disturbance with and without the control loop as shown in FIG. 2.

FIGS. 4-7 illustrate the simulated disturbance responses for a wind turbine system with and without the control loop as shown in FIG. 2. FIG. 4 and FIG. 5 show the frequency and power responses respectively for an oscillatory system disturbance. In FIG. 4, the X-axis of the simulated graph 114 is denoted by the reference numeral 116 and generally depicts time following the frequency deviation or disturbance (transient time) and the Y-axis, denoted by reference numeral 118, depicts the frequency of response. As illustrated, curve 120 is the response to the utility system disturbance without employing the control loop of FIG. 2. The curve 122 on the other hand shows the frequency response to the utility system disturbance when the control loop of FIG. 2 is employed in the wind turbine system. The limits used were +/−3% limit on the supplemental power signal.

In the simulated graph 124 as shown in FIG. 5, the X-axis is denoted by the reference numeral 126 and generally depicts the transient time and the Y-axis, denoted by reference numeral 128, depicts the supplemental power signal. As illustrated, line 130 is the zero supplemental power input when not employing the control loop of FIG. 2. The curve 132 on the other hand shows the supplemental power input when the control loop of FIG. 2 is employed in the wind turbine system. The resulting system frequency behavior as shown by curve 122 in FIG. 4 and curve 132 in FIG. 5 shows improvement in both power swing magnitude and damping.

Figure 6:
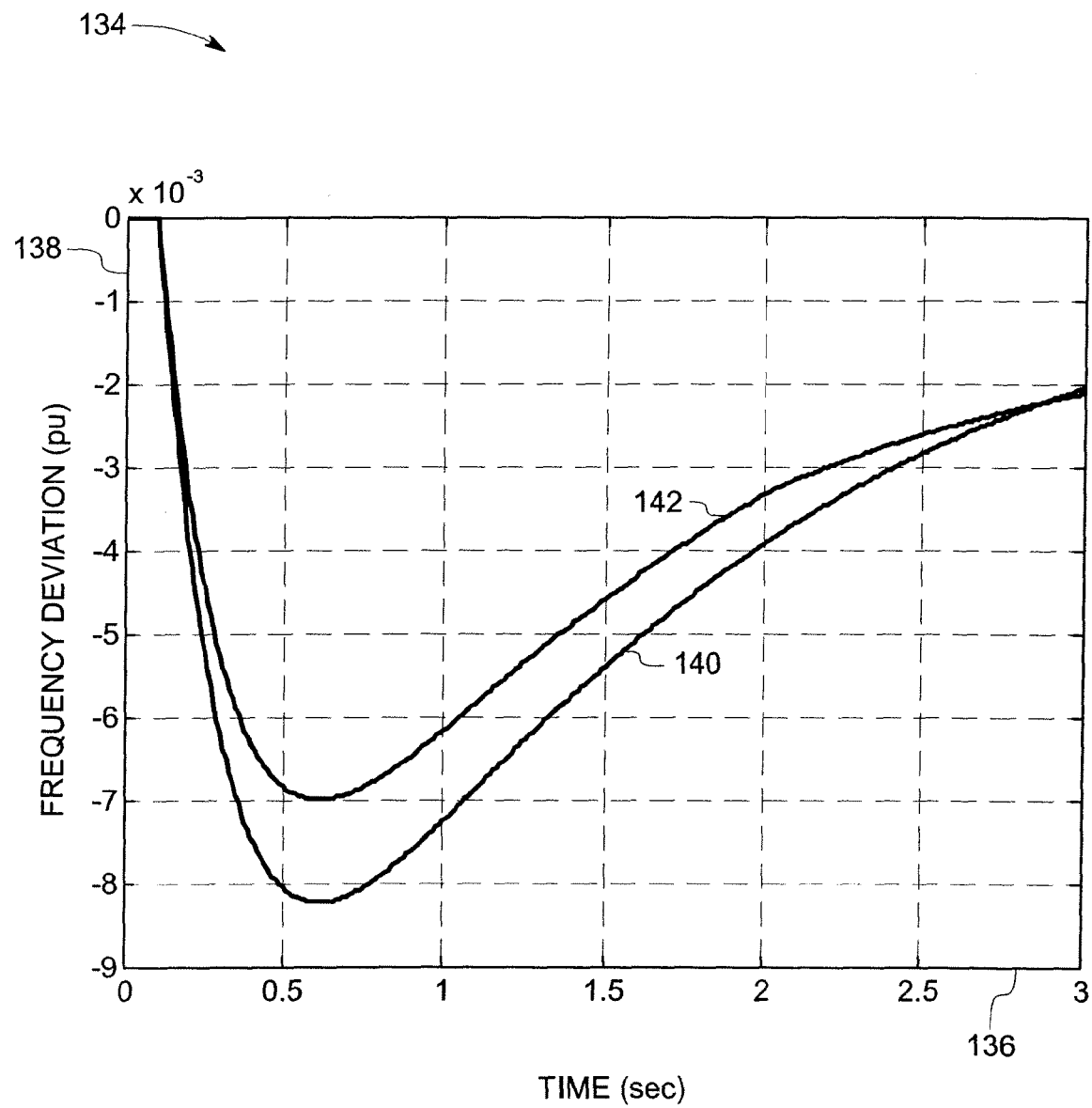
FIG. 6 is a simulated graphical representation of frequency deviation or disturbance response for a monotonic oscillatory system disturbance with and without the control loop as shown in FIG. 2.
Figure 7:
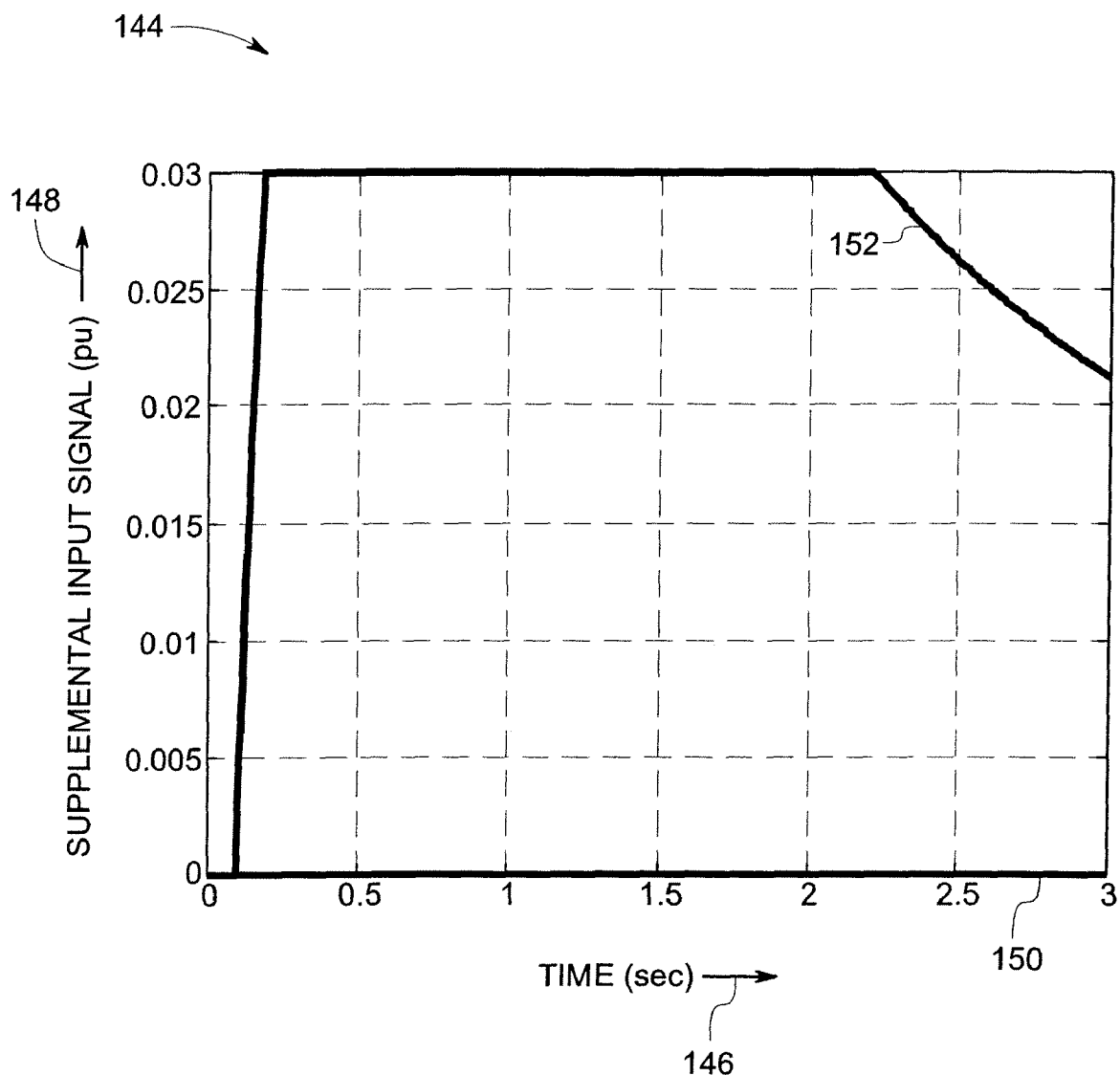
FIG. 7 is a simulated graphical representation of the supplemental power disturbance response for a monotonic system disturbance with and without the control loop as shown in FIG. 2.

Similarly FIG. 6 and FIG. 7 show disturbance responses for a monotonic system disturbance. In the simulated graph 134 of FIG. 6, the X-axis is denoted by the reference numeral 136 and generally depicts the transient time and the Y-axis, denoted by reference numeral 138, depicts the frequency of response. As illustrated, curve 140 is the response to the utility system disturbance without employing the control loop of FIG. 2. The curve 142 on the other hand shows the response to the utility system disturbance when the control loop of FIG. 2 is employed in the wind turbine system.

FIG. 7 similarly shows a simulated graph 144 illustrating another pair of responses, the X-axis is denoted by the reference numeral 146 and generally depicts the transient time and the Y-axis, denoted by reference numeral 148, depicts the supplemental power of the wind turbine generator. As illustrated, line 150 is the zero supplemental power input when not employing the control loop of FIG. 2. The response 152 on the other hand shows the supplemental power input when the control loop of FIG. 2 is employed in the wind turbine system.

Thus as described above, the transient power output or the supplemental input signal may be implemented as a linear or non-linear relationship of relative angle, relative frequency, and/or time, subject to multiple limits. Limitations on the power amplitude and energy may also be used. Specifically, the amplitudes of the power limits, shown for example at +/−0.03 pu (per unit) in the FIG. 5 and FIG. 7 graphs are functions of both physical limitations of the electrical equipment, especially the converter, and the physical limitations of mechanical equipment, especially the drive-train torque and speed.

Figure 8:
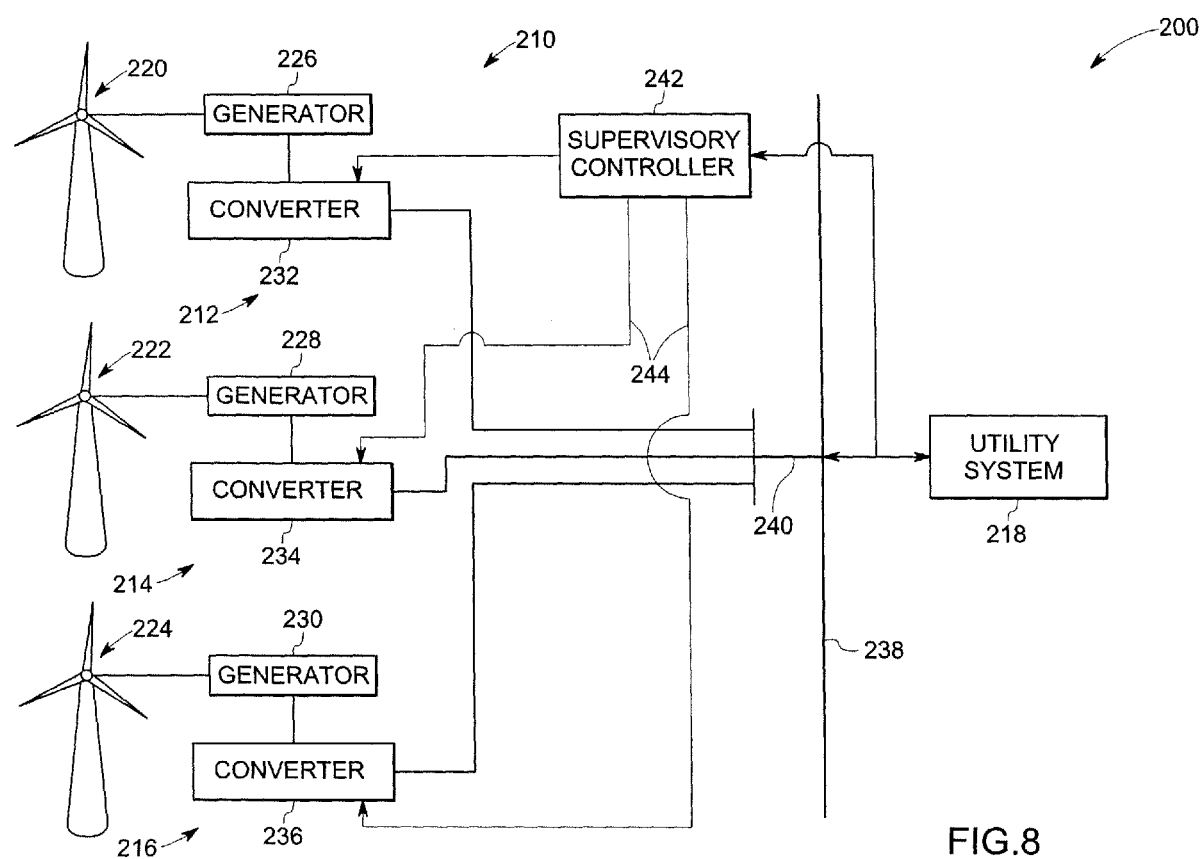
FIG. 8 is a diagrammatical representation of a wind farm management system for stabilizing power and frequency during transient conditions in accordance with one embodiment.

It will be well appreciated by those skilled in the art that the control technique described herein may be utilized in a system for wind farm management as well. Such a wind farm management system 200 is shown as an exemplary embodiment in FIG. 8. The wind farm management system 200 includes a wind farm 210 having wind turbines 212, 214, and 216 operable to supply electrical power to a utility system 218. It will be appreciated by those skilled in the art that three wind turbines are shown for the purpose of illustration only, and the number may be greater based on the geographical nature and power requirements of any particular region.

Wind turbines 212, 214, 216 include turbine rotors 220, 222, 224, each rotor having multiple blades, which drive rotors 220, 222, 224 respectively to produce mechanical power, which is converted, to electrical power by the generators 226, 228, and 230 respectively. Converters 232, 234, 236 are used to convert the variable frequency output from the generators 226, 228 and 230 respectively into a fixed frequency output. Power produced by generators 226, 228 and 230 may be coupled to a voltage distribution network or a collector system 238, which is coupled to the utility system 218. In the illustrated embodiment, a feeder 240 is used to couple power outputs of wind turbine generators 226, 228 and 230 for supply to the voltage distribution network 238. In a typical application, the voltage distribution network 238 couples power from multiple feeders (not shown), each feeder coupling power outputs of multiple wind turbine generators.

In one exemplary embodiment, the wind farm 210 includes a wind farm supervisory controller 242. The supervisory controller 242 is configured to communicate with individual wind turbine converters via communication links 244, which may be implemented in hardware, software, or both. In certain embodiments, the communication links 244 may be configured to remotely communicate data signals to and from the supervisory controller in accordance with any wired or wireless communication protocol known to one skilled in the art. The supervisory controller 242 includes an internal reference frame, and is coupled to the converters 232, 234, 236, and is configured for modulating flow of power through the converters 232, 234, 236 in response to utility system frequency disturbances or power swings relative to the internal reference frame. The functionality of the supervisory controller 242 will be similar to that of controller 32 described in reference to FIG. 2. In another embodiment, a plurality of controllers of the type shown in FIG. 1 are provided to modulate the flow of power through each respective converter.

It will be appreciated by those skilled in the art, that the wind turbine system has been referred in the above embodiments as an exemplary power generation and power management system coupled to the utility system. Aspects of present technique are equally applicable to other distributed generation sources operable to supply power to the utility system. Examples of such sources include fuel cells, microturbines and photovoltaic systems. Such power managements systems will similarly include converters, each converter coupled to a respective generation source and the utility system, and an individual or supervisory controller coupled to the converters. As explained herein above, the controller includes an internal reference frame configured for modulating flow of power through the converters in response to frequency disturbances or power swings of the utility system relative to the internal reference frame.

The controller, as described in the exemplary embodiments, provides a dynamic control structure to modulate the torque or power component of wind turbine generator output current as a function of the electrical angle (or relative frequency or time) between the utility system and the internal wind turbine generator virtual-reference frame ("internal reference frame). The implementations of the above embodiments will also advantageously facilitate the utility system independent operation of the wind turbine system, if desired, assuming high wind conditions and slow load dynamics.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for wind farm management, the system comprising:
    a plurality of wind turbine generators operable to supply wind turbine power to a utility system;
    a plurality of converters, each converter coupled to a respective wind turbine generator and the utility system; and
    a controller comprising an internal reference frame of the wind turbine generators and configured for modulating flow of power through the plurality of converters in response to frequency disturbances or power swings of the utility system relative to the internal reference frame, wherein the internal reference frame comprises a variable frequency that is equal to a frequency of the utility system during steady state conditions and that differs from the utility system frequency during frequency disturbances wherein modulating the flow of power comprises providing a supplemental input signal ($\Delta P$) configured to increase or decrease power output of the wind farm.

2. The system of claim 1 wherein the controller comprises a supervisory controller.

3. The system of claim 1 wherein the controller comprises a plurality of individual controllers each coupled to a respective one of the plurality of converters.

4. The system of claim 1 further comprising a difference element configured to obtain a relative frequency comprising a difference between the utility system frequency and the variable frequency.

5. The system of claim 1 wherein the supplemental input signal comprises a torque or power signal and is a function of at least one of a relative angle, a relative frequency, or time.

6. The system of claim 1 further comprising a limit function configured for limiting a relative angle, a relative frequency, a supplemental power or torque signal, or combinations thereof.

7. The system of claim 6 wherein the limit function comprises limits that are operable as a function of at least one of a physical limitation on the wind turbine system, a power limit, a torque limit, a current limit, an energy limit, or a wind turbine generator rotor speed limit.

8. The system of claim 1 further comprising an energy storage element, an energy consumer element or combinations thereof, wherein the energy storage element, the energy consumer element or the combinations thereof are coupled to the converter.

9. A system for power management, the system comprising:
    a plurality of distributed generation sources operable to supply power to a utility system;
    a plurality of converters, each converter coupled to a respective generation source and the utility system; and
    a controller coupled to the plurality of converters, the controller comprising an internal reference frame of the distributed generation sources, coupled to the plurality of converters, and configured for modulating flow of power through the plurality of converters in response to frequency disturbances or power swings of the utility system relative to the internal reference frame, wherein the internal reference frame comprises a variable frequency that is equal to a frequency of the utility system during steady state conditions and that differs from the utility system frequency during frequency disturbances wherein modulating the flow of power comprises providing a supplemental input signal ($\Delta P$) configured to increase or decrease power output of the system.

10. The system of claim 9, wherein the internal reference frame is configured to output a frequency that may differ from the utility system during transient conditions.

11. The system of claim 9 wherein the controller comprises a supervisory controller.

12. The system of claim 9 wherein the controller comprises a plurality of individual controllers each coupled to a respective one of the plurality of converters.

* * * * *